United States Patent

[11] 3,582,695

[72] Inventor  John Wannamaker
              Orangeburg, S.C.
[21] Appl. No. 850,818
[22] Filed     Aug. 18, 1969
[45] Patented  June 1, 1971
[73] Assignee  SCM Corporation

[54] MECHANICALLY TOGGLED ELECTRICAL PULSE GENERATOR
     6 Claims, 4 Drawing Figs.

[52] U.S. Cl. ................................................. 310/15,
                                            310/27, 310/36
[51] Int. Cl. .............................................. H02k 35/04
[50] Field of Search ..................................... 310/5, 13,
                                        27, 36—39, 29; 179/87

[56]              References Cited
                UNITED STATES PATENTS
2,135,843  11/1938  Pye............................  310/36

3,052,803  9/1962  Richardson ................  310/15X

*Primary Examiner*—D. F. Duggan
*Attorney*—Joe O. Bolt, Jr.

ABSTRACT: This disclosure relates to a mechanically toggled electrical pulse generator for generating pulses of electrical energy. More particularly, this invention includes a permanent magnet having a coil armature operatively associated therewith. The coil armature includes two oppositely directed magnet attraction elements with the armature supported for movement relative to the permanent magnet between a first position where a flux path is developed through the armature in a first direction and to a second position where the flux path is directed in an opposite direction. The pulse generator includes mechanically toggled elements for moving the coil armature between the first and second position in a rapid sequence to thereby effect a rapid change in the flux density in the coil armature and generate a pulse of electrical energy at output leads associated therewith.

INVENTOR.
John Wannamaker
BY Leo O Belsky

INVENTOR.
John Wannamaker
BY 3,582,695

MECHANICALLY TOGGLED ELECTRICAL PULSE GENERATOR

OBJECTS OF THE INVENTION

It is therefore a primary object of this invention to provide a mechanically toggled electrical pulse generator capable of generating pulses of electrical energy.

A further object of this invention is to provide a pulse generator which includes a permanent magnet and a coil armature means operatively associated with the permanent magnet for developing a two-directional flux path.

A still further object of this invention is to provide a pulse generator which includes a coil armature element operatively associated with a permanent magnet for developing a flux path in a first direction, which includes mechanically toggled elements for rapidly changing the position of the armature element to thereby effect a rapid change in the flux density in the coil armature to generate a pulse of electrical energy as a result of the change in flux density.

Another object of this invention is to provide a pulse generator which includes spring-biasing means associated with an armature element for effecting a rapid movement of the armature element relative to a permanent magnet to thereby reverse the direction of a flux path generated by the armature and permanent magnet.

Still another object of this invention is to provide a mechanically toggled electrical pulse generator which is economical to manufacture, simple in construction, and reliable in operation.

Still other objects and advantages of the invention will become apparent in the details of construction after reading the accompanying specifications with reference to the attached drawings wherein like reference characters have been used to refer to like parts throughout the figures of drawings.

BRIEF DESCRIPTION OF THE FIGURES OF DRAWINGS

DESCRIPTION OF ILLUSTRATED EMBODIMENT

Figure 1:
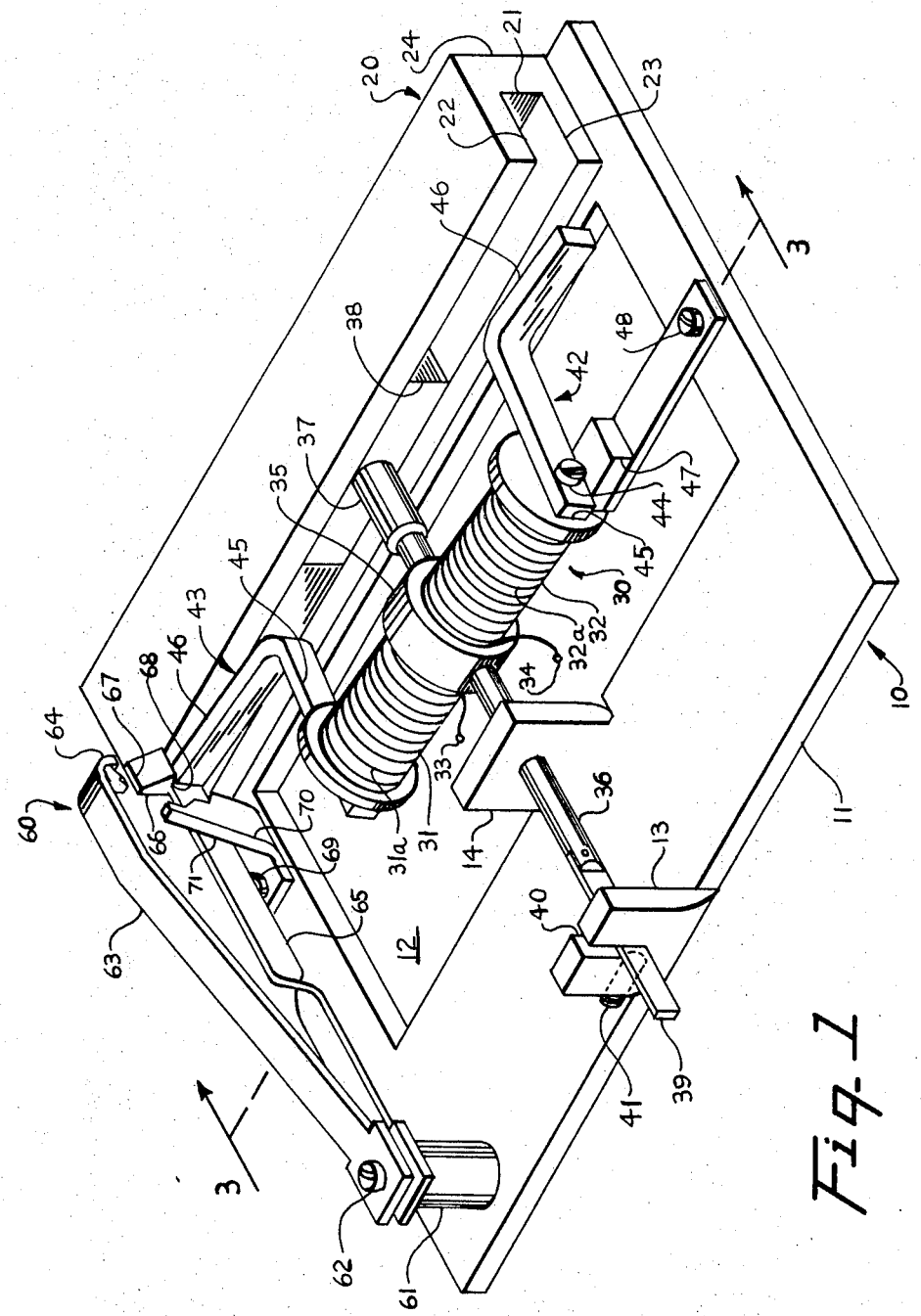
FIG. 1 is a perspective view of the pulse generator with certain parts broken away for purposes of clarity.

Referring now to the drawings, the mechanically toggled pulse generator will be described with reference to a main support means 10, a permanent magnet 20, a coil armature means 30, and a manually controlled toggled mechanism 60.

Referring now particularly to FIG. 1, the main support means 10 includes a substantially rectangular shaped supporting base element 11 having defined therein a rectangular shaped opening 12. Formed integrally with the base element 11 is a pair of upturned vertically oriented, spaced and aligned support brackets 13, 14.

As shown in the drawings, the permanent magnet 20 is supported on the base element 11 adjacent opening 12. The permanent magnet 20 is detailed and designed to form an elongated substantially U-shaped or channel-shaped element 21 including a pair of leg portions 22, 23 joined together by a connecting base portion 24. The channel-shaped element 21 is supported relative to opening 12 such that the leg portions 22, 23 are directed toward opening 12 and extended along an edge thereof.

Figure 2:
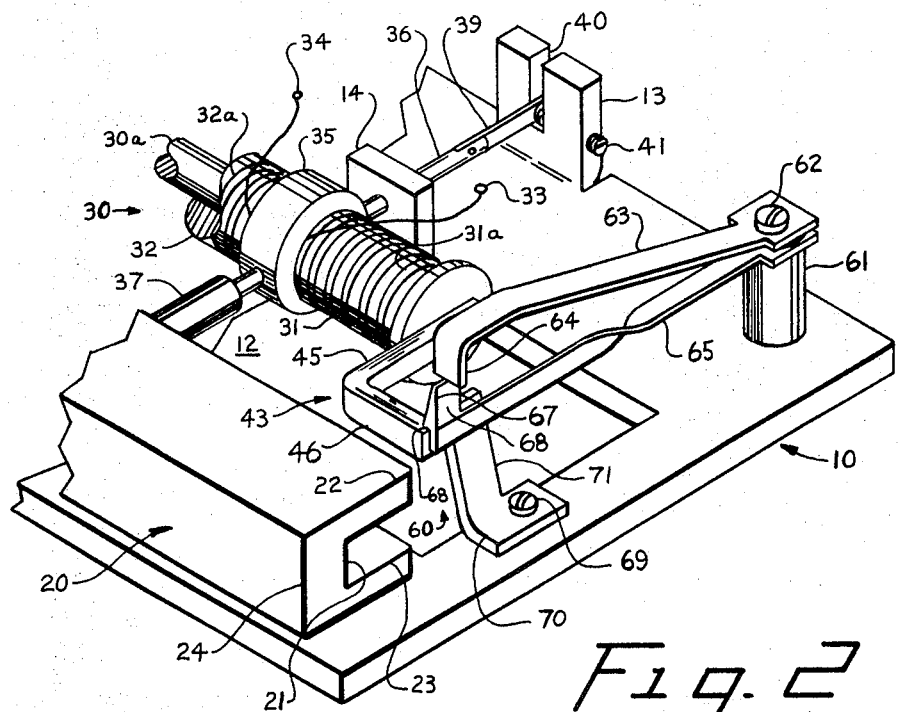
FIG. 2 is a fragmentary perspective view taken from an opposite angle as FIG. 1, showing the details of the mechanically toggled elements.
Figure 3:
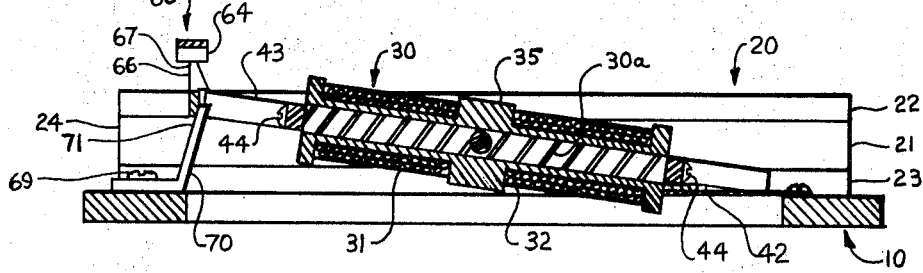
FIG. 3 is a vertical sectional view taken along the lines 3-3 to FIG. 1.
Figure 4:
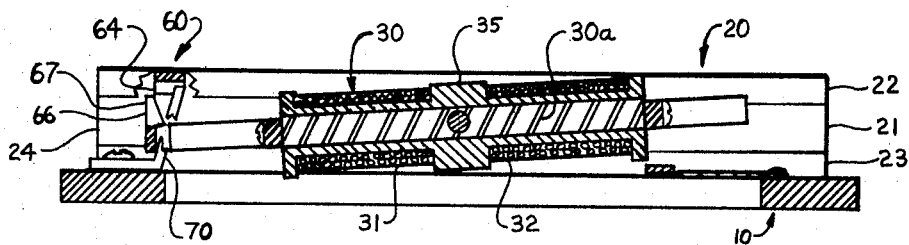
FIG. 4 is a vertical section similar to FIG. 3 showing the armature element moved to a second position.

Referring now to FIGS. 1, 3, and 4, the coil armature 30 includes two coil portions 31, 32 having output leads 33, 34. Each of the coil portions 31, 32 includes a coil of wire 31a, 32a wound around, but electrically insulated from a soft steel or iron core 30a (FIG. 2). Fixed to the armature 30 intermediate coil portions 31, 32 is a collar 35. The collar 35 is fixed to a shaft 36 which is journaled for rotation in a bushing 37 fixed to a support block 38 mounted between the leg portions 22, 23 of the permanent magnet 20. An opposite end of shaft 36 is journaled for rotation within the upturned support bracket 14 with an end extending therethrough and fixed to a torsion spring element 39. The torsion spring element 39 is supported in a notch 40 formed in upturned support bracket 13. The torsion spring element 39 is held within notch 40 and confined against movement therein by a threaded setscrew element 41. Fixed to opposite extended ends of the coil core element 30a is a pair of L-shaped brackets 42, 43. Each of the L-shaped brackets 42, 43 is secured to the coil core element 30a by means of a thread connecting screw 44. Each of the L-shaped brackets 42, 43 is constructed of material similar to core element 30a and provided with a connecting leg portion 45 and a magnet attracting leg portion 46. The coil armature 30 is detailed in supporting relationship relative to the permanent magnet 20 in such a manner that the coil armature magnet attracting leg portions 46 are supported adjacent opposite leg portions of the permanent magnet 20 (as shown in FIG. 3.) The coil armature is also supported for pivotal movement by shaft 36 such that the magnet attracting leg portions 46 can be moved to opposite leg portions 22, 23 of the permanent magnet 20 to thereby reverse the direction of flow of the flux path and effect a rapid change in flux density in the coil armature. As shown in FIGS. 1 and 3, the coil armature is supported in a first oriented home position whereby the L-shaped element 42 will be in abutting relationship with a stop element 47 connected to the base element 11 by a thread screw means 48.

Movement of the coil armature to reverse the direction of the flux path is effected by a manually controlled toggled mechanism 60. The toggled mechanism 60 is supported on the base element 11 by a spacer 61 and a thread connecting means 62. The toggled mechanism 60 includes a first manually controlled leaf spring element 63 having a first end connected to the thread connection 62 and being provided with an extended end terminating in a downturned portion 64. Supported directly beneath and in vertical alignment with the first leaf spring element 63 is a second actuating leaf spring element 65. The second leaf spring element includes a first end fixed to the thread connection 62 and an extended end terminating in an actuating element 66 including an upwardly extending projection 67 supported in abutting relationship beneath the downturned portion 64 of the first leaf spring element 63. Also provided on the actuating element 66 is a shoulder portion 68 supported in abutting relationship above an adjacent and extended end of the magnetic attracting leg 46. The second leaf spring element is detailed for biasing movement in a first direction in substantially vertical alignment with the direction of movement of the first leaf spring element and for biasing movement in a second horizontal direction substantially perpendicular to said first direction of spring-biasing movement. Supported on base element 11 by a thread connecting means 69 is a camming member 70. The camming member 70 is supported relative to the second leaf spring element 65 in such a manner as to include a camming surface 71 operatively associated with said second spring biasing element 65 as to effect a camming movement of the leaf spring element 65 in the horizontal direction of movement. Movement of the leaf spring element 65 in the first direction of spring-biasing movement is effected by a manual depression of the first leaf spring 63 thereby causing the downturned portion 64 to contact the upturned projection 67 of the second leaf spring 65. The camming surface 71 is detailed to cam the shoulder portion 68 off of the extending end of the magnetic attracting leg 46. The extension of horizontal camming movement by camming surface 71 in response to a degree of downward movement of the manually controlled leaf spring element 65 is detailed to allow the magnetic attracting leg portions 46 to move to the opposite magnetic pole elements 22, 23 (as shown in FIG. 4).

OPERATION

In operating the mechanically toggled electrical pulse generator to produce output pulses of electrical energy in the output leads 33, 34, the coil armature is held in a position (as shown in FIGS. 1 and 3) by the detailed adjustment of torsion spring means 39. In the position shown in FIGS. 1 and 3 the armature magnetic attracting leg portions 46 are positioned relative to the permanent magnet in such a manner that they are adjacent opposite poles of the permanent magnet. In this position the flux path will flow in one direction from one pole of the permanent magnet 20 through the armature core 30a to an opposite pole of the permanent magnet. To generate an electrical pulse, an operator depresses the manual control release spring element 63 downwardly thereby forcing the armature to rotate with shaft support means 36 to position the armature in a second position whereby the magnetic attracting leg portions 46 are moved to opposite poles of the permanent magnet. The rotative movement of the armature 30 is effected by the shoulder portion 68 contacting an extending end of the magnetic attracting leg 46. A continued downward movement of the two leaf spring elements 63, 65 will cause the leaf spring element 65 to contact camming surface 71 thereby camming the second leaf spring horizontally and permitting the shoulder portion 68 to be disengaged from the extending end of the magnetic attracting leg portion 46. Upon disengagement of shoulder portion 68 from leg portion 46, energy stored in the torsion spring means 39 will effect a rapid return of the armature 30 thereby rapidly changing the flux density of the flux path developed between the magnetic 20 and armature 30. This rapid change of the flux density will generate an output pulse of electrical energy in the leads 33, 34.

It now becomes apparent that the above-described details of construction of the illustrative embodiment is capable of obtaining the above-stated objects and advantages. It is obvious that those skilled in the art may make modifications in the details of construction without departing from the spirit of the invention, which is thereby limited only by the scope of the appended claims.

What I claim is:

1. A mechanically toggled pulse generator for generating electrical energy comprising, in combination:
   a. a two-pole permanent magnet supported on said generator, said two-pole permanent magnet being an elongated channel-shaped member having a base, with said two poles defining the legs of said channel and being located on opposite sides of said base to define a substantially open channel therebetween;
   b. a coil armature means pivotally mounted on said pulse generator for movement about an axis substantially perpendicular to said base and parallel to said two poles and operatively associated with said permanent magnet in such a manner as to develop a magnetic flux between said two poles through said armature in one direction; and
   c. control means operatively associated with said armature for effecting relative movement between said armature and said permanent magnetic to reverse the direction of the flux path through said armature between said two poles.

2. A mechanically toggled electrical pulse generator for use in generating pulses of electrical energy comprising, in combination:
   a. a two-pole permanent magnet supported on said pulse generator;
   b. a coil armature having oppositely directed magnet attracting elements operatively supported relative to said permanent magnet in such a manner that one of said armature attraction elements is supported adjacent each of said permanent magnetic pole elements;
   c. a pair of output pulse leads operatively connected to said coil armature;
   d. control means supported on said pulse generator and operatively associated with said coil armature for effecting movement of said armature attraction elements to opposite poles of said permanent magnet;
   e. release means operatively associated with said control means for effecting a release of said control means from said armature attraction element in response to movement of said armature attraction element to said opposite pole; and
   f. spring return means operatively associated with said armature attraction elements for effecting a rapid return of said elements to their original attraction position, whereby an electrical pulse is generated in said armature element and available as electrical energy in said output leads.

3. A mechanically toggled pulse generator as described in claim 2 further characterized in that said control means includes mechanical spring-biased toggled elements.

4. A mechanically toggled pulse generator as described in claim 3 further characterized in that said permanent magnet is substantially U-shaped in design with one of said armature attraction elements positioned adjacent each leg portion of said U-shaped magnet.

5. A mechanically toggled pulse generator as described in claim 4 further characterized in that said spring return means includes a torsion spring element fixed to said armature in such a manner as to provide a pivot support means for said armature and to bias said armature attraction elements to said fixed attraction position.

6. A mechanically toggled pulse generator as described in claim 5 further characterized in that said mechanical toggled elements include a first element supported for spring-biasing movement in a first direction, a second element supported for spring-biasing movement in said first direction and for spring-biasing movement in a second direction substantially perpendicular to said first direction, said second element including a shoulder portion in abutting engagement with one of said armature attraction elements and in abutting engagement with a surface on said first element, camming means operatively associated with said second element for effecting movement of said second element in said second direction, whereby movement of said first element will effect movement of said second element in said first direction to move said armature attraction element to the opposite magnet poles and wherein said camming element will effect movement of said second element in said second direction to release said shoulder portion from said armature attraction element in response to movement of said attraction element to said opposite pole.